United States Patent

[11] 3,526,177

[72] Inventors Gerd Kiper
Ludersen, Germany;
Dieter Engelsmann, Unterhaching,
Germany; Günther Pawlik, Munich,
Germany
[21] Appl. No. 695,730
[22] Filed Jan. 4, 1968
[45] Patented Sept. 1, 1970
[73] Assignee Agfa-Gevaert Aktiengesellschaft
Leverkusen, Germany
[32] Priority Jan. 7, 1967
[33] Germany
[31] A 54,553

[54] ELECTRONICALLY CONTROLLED SHUTTER FOR PHOTOGRAPHIC CAMERAS
10 Claims, 2 Drawing Figs.
[52] U.S. Cl. .................................................. 95/10,
95/53, 250/208, 356/222, 356/224
[51] Int. Cl. ........................................................ G01j 1/46,
G03b 7/08
[50] Field of Search .............................................. 95/10C, 53,
64; 356/222, 224; 250/208

[56] References Cited
UNITED STATES PATENTS

| | | | |
|---|---|---|---|
| 3,397,629 | 8/1968 | Mori et al. ..................... | 95/10(C)UX |
| 3,425,328 | 2/1969 | Ichijo et al. .................... | 95/10(C)UX |
| 3,429,244 | 2/1969 | Von Wasielewski ......... | 95/10(C)UX |
| 3,433,140 | 3/1969 | Wick et al. ..................... | 95/10(C)UX |
| 3,452,656 | 7/1969 | Ruhle et al. .................... | 95/10(C)UX |

*Primary Examiner*—Norton Ansher
*Assistant Examiner*—Joseph F. Peters, Jr.
*Attorney*—Michael S. Striker

ABSTRACT: An electronically operated diaphragm shutter wherein the movements of blades are controlled by an electronic timing circuit having a first portion which controls movements of blades as a function of a range of relatively high scene brightnesses and a second portion energizable to control movements of blades as a function of a range of relatively low scene brightnesses. A relay which is connected in an indicating circuit automatically energizes the appropriate portion of the timing circuit in accordance with measurements of scene brightness by the indicating circuit. The latter includes signal lamps which light up to indicate whether or not the scene brightness is satisfactory for exposures with hand-held camera.

INVENTORS:
GERD KIPER
DIETER ENGELSMANN
GÜNTHER PAWLIK

ELECTRONICALLY CONTROLLED SHUTTER FOR PHOTOGRAPHIC CAMERAS

CROSS-REFERENCE TO RELATED APPLICATION

The shutter of our present invention constitutes an improvement over and a further development of the shutter disclosed in the copending application Ser. No. 670,625, filed by Gerd Kiper on September 20, 1967 and assigned to the same assignee.

BACKGROUND OF THE INVENTION

The present invention relates to shutters for photographic cameras, and more particularly to improvements in electronically operated shutters. Still more particularly, the invention relates to improvements in electronically operated diaphragm shutters wherein the blade or blades define an aperture of requisite size for a particular scene brightness.

The aforementioned copending application Ser. No. 670,625 of Kiper discloses an electronically operated shutter wherein the timing circuit comprises a first portion which determines the exposure time and the aperture size for a range of relatively high intensities of scene light and a second portion which determines the aperture size and the exposure time for a range of lesser intensities. An indicating circuit determines and indicates the intensity of scene light so that the user can read the indications and is in a position to energize the appropriate portion of the timing circuit.

SUMMARY OF THE INVENTION

It is an object of our invention to provide an electronically operated shutter wherein the energization of appropriate portions of the timing circuit takes place automatically so that the user of the camera need not perform any manipulations for the express purpose of adjusting the circuitry in response to detection of a particular scene brightness.

Another object of the invention is to provide an electronically operated diaphragm shutter which can furnish indications of prevailing scene brightness and thus enables the user to decide whether an exposure can be made with camera held by hand or whether the camera must be mounted on a fixed support.

A further object of the invention is to provide a novel operative connection between the shutter adjusting and light measuring components of the circuitry in an electronically operated diaphragm shutter.

An additional object of the invention is to provide an electronically operated diaphragm shutter which can discriminate between scene brightnesses requiring shorter or longer exposure times and which insures that the camera can make exposures with satisfactory depth of field even in situations when the intensity of scene light is low.

A concomitant object of the invention is to provide a novel circuit assembly for an electronically operated diaphragm shutter.

The improved shutter comprises movable setting means (preferably including one or more blades or vanes) operative to furnish optimum exposure values (exposure time and/or aperture size) for a first and a second range of scene brightnesses, a timing circuit including first and second portions energizable to respectively control the movements of setting means as a function of scene brightnesses in the first and second ranges, an indicating circuit for measuring the scene brightness, and automatic switchover means for energizing the appropriate portion of the timing circuit in accordance with the results of measurements of scene brightness by the indicating circuit. The switchover means comprises relay means connected in the indicating circuit.

The novel features which are considered as characteristic of the invention are set forth in particular in the appended claims. The improved shutter itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
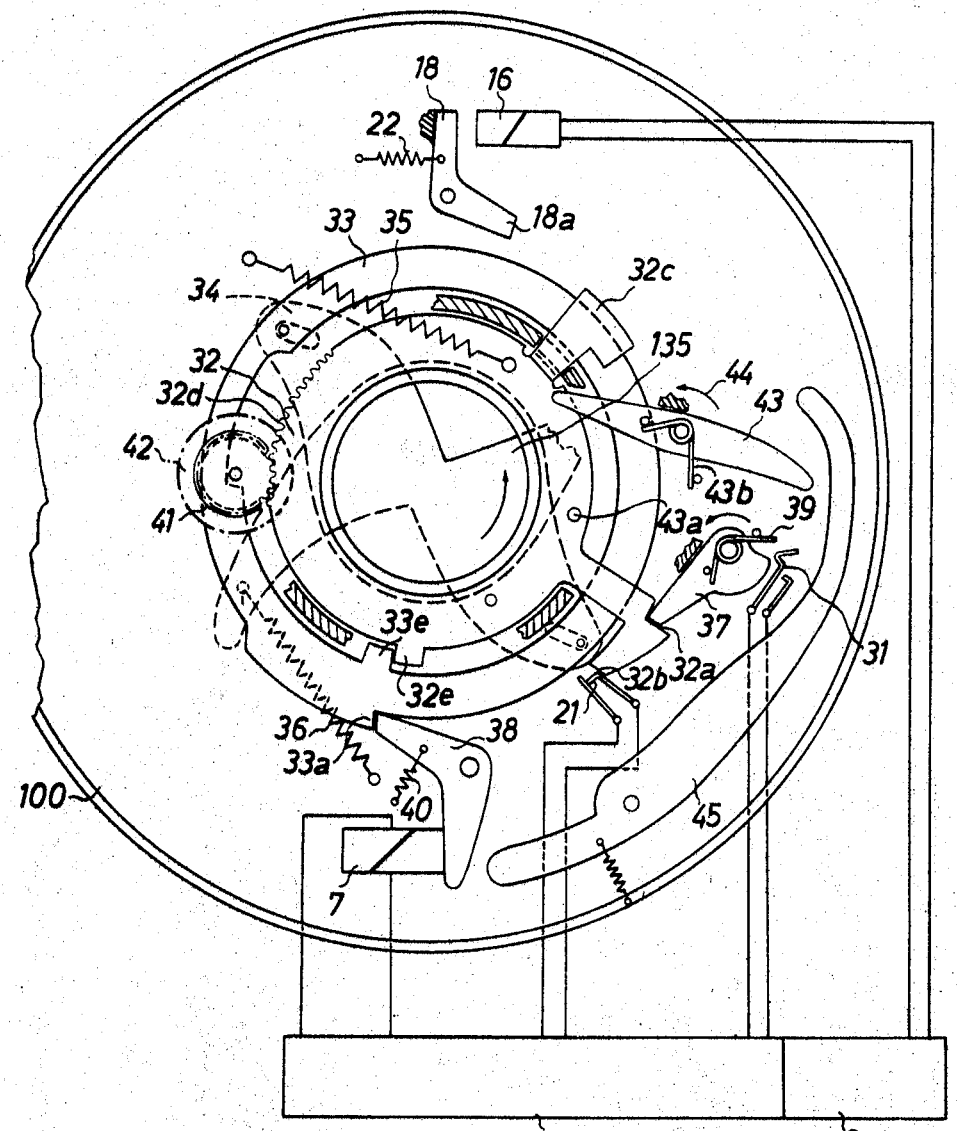
FIG. 1 is a schematic partly elevational and partly sectional view of a diaphragm shutter which embodies our invention.

FIG. 1 illustrates an electronic shutter which also acts as a diaphragm. The shutter comprises two coaxial setting rings 32, 33 which can turn back and forth about the optical axis of the objective. The ring 32 is the leading ring and the ring 33 is the trailing ring. Shutter blades 34 are coupled to the rings 32, 33 by pin-and-slot connections so that they can cover or uncover an objective opening 135. The size of the aperture defined by the blades 34 varies when the ring 32 turns with reference to the ring 33 or vice versa. These rings are respectively biased to uncocked positions by helical return springs 35, 36 each of which has one of its ends affixed to a plate 100 of the shutter housing. Blocking levers 37, 38 engage shoulders 32a, 33a of rings 32, 33 when the rings assume their cocked positions shown in FIG. 1. The lever 37 constitutes a shutter release and also serves as a means for closing a normally open master switch 31. A torsion spring 39 biases the lever 37 in a counterclockwise direction to maintain it in engagement with the shoulder 32a of the leading ring 32. The latter has a projection 32b which maintains in closed position a control switch 21 which has a tendency to open and is free to open in response to a small angular displacement of the ring 32 from cocked position.

The lever 38 constitutes the armature of an electromagnet 7 and holds the shoulder 33a of the trailing ring 33 when the electromagnet is energized. A spring 40 disengages the lever 38 from the shoulder 33a in response to deenergization of the electromagnet 7.

A portion 32d of the periphery of the leading ring 32 is provided with teeth meshing with the teeth of a pinion 41 forming part of a retard mechanism 42 which is of known design. The purpose of the mechanism 42 is to insure that the leading ring 32 turns rather slowly with reference to trailing ring 33 when the lever 37 is disengaged from the shoulder 32a, i.e., when the ring 32 turns under the bias of its return spring 35. The lever 37 can be disengaged from shoulder 32a in response to depression of a customary button, not shown. If the ring 32 reaches its uncocked position prior to disengagement of lever 38 from the shoulder 33a, the blades 34 define an aperture of maximum size. However, if the electromagnet 7 permits the spring 40 to disengage the lever 38 from the shoulder 33a before the ring 32 reaches its uncocked position, the blades define an aperture of a size which is less than the maximum size because the spring 36 is then free to rapidly turn the ring 33 to uncocked position.

The leading ring 32 is provided with a projection or arm 32c which can be engaged and arrested by the arm 18a of a two-armed arresting lever 18 constituting the armature of a switchover relay 16. A spring 22 normally maintains the lever 18 in the idle position shown in FIG. 1 in which the arm 32c is free to bypass the arm 18a. When the switchover relay 16 attracts the lever 18, the arm 18a arrests the leading ring 32 in an intermediate position in which the ring 32 remains to provide a medium-sized aperture which is closed when the electromagnet 7 releases the lever 38 to permit movement of trailing ring 33 to uncocked position. The aperture is closed when the rings 32, 33 are fully cocked or uncocked, as well as when these rings can move simultaneously from uncocked to cocked positions.

The cocking means comprises a two-armed lever 43 which can be turned by hand or in response to manipulation of the film transporting mechanism. When turning in the direction indicated by arrow 44, the lever 43 engages a post 43a on the leading ring 32 and turns the latter in a clockwise direction. A lug 32e of the ring 32 then engages a lug 33e of the ring 33 so that the two rings are cocked as a unit and cause the springs 35, 36 to store energy. A torsion spring 43b biases the lever 43 to the idle position shown in FIG. 1. The cocking of rings 32, 33 is completed when the levers 37, 38 respectively engage the shoulders 32a, 33a to prevent anticlockwise rotation of the rings. An intermediate lever 45 is turned by the lever 43 during cocking and thereby energizes the lever 38 to turn the latter against the opposition of spring 40 and toward engagement with the shoulder 33a.

Figure 2:
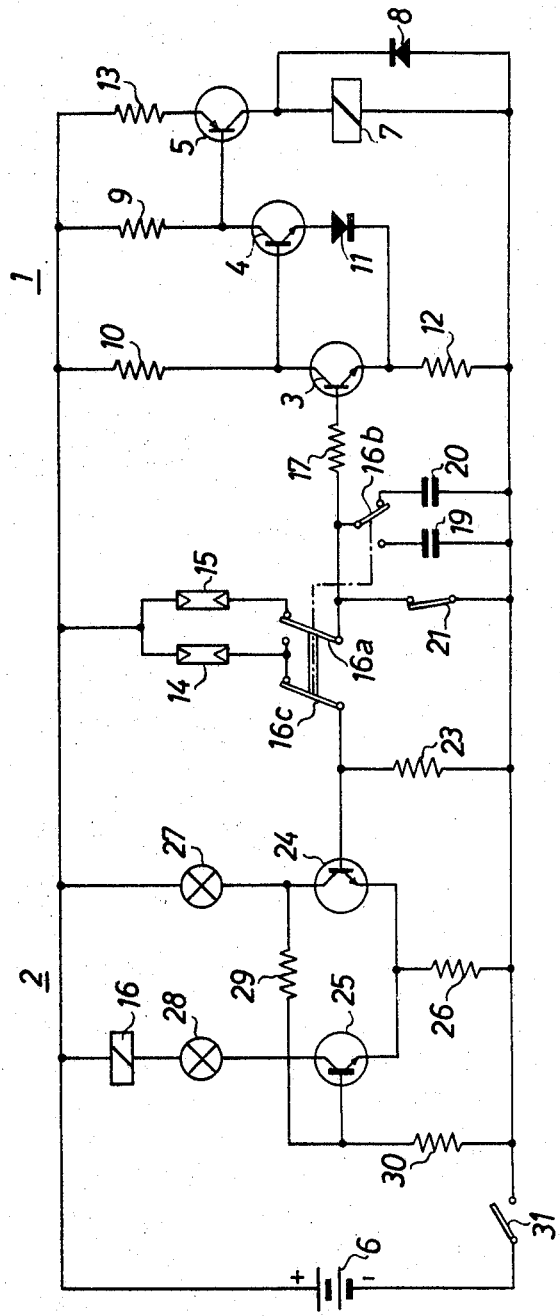
FIG. 2 is a diagram of the electronic circuitry in the shutter of FIG. 1.

The electromagnet 7, relay 16 and switches 21, 31 form part of an electronic circuit assembly including the circuits 1 and 2 which are shown in detail in FIG. 2. The circuit 1 is a timing circuit and serves to control movements of setting rings 32, 33 and blades 34, and the circuit 2 serves to indicate the scene brightness.

The timing circuit 1 comprises three transistors 3, 4 and 5. The winding of the electromagnet 7 is connected between the collector of the transistor 5 and the negative terminal of a battery 6 or another suitable source of electrical energy. A diode 8 is connected in parallel with the electromagnet 7. As stated before, the electromagnet 7 controls the blocking lever 38 for the trailing setting ring 33, i.e., this electromagnet can initiate closing of the shutter.

The transistors 3, 4 are of the n-p-n type and their collectors are connected with the positive terminal of the battery 6 by way of resistors 10 and 9, respectively. The base of the transistor 4 is connected to a junction of the resistor 10 and the collector of the transistor 3. The emitters of transistors 3, 4 are connected to each other by way of a diode 11, and the emitter of transistor 3 is connected to the negative terminal of battery 6 by way of a resistor 12.

The transistor 5 is of the p-n-p type and its emitter is connected with the positive terminal of battery 6 through the intermediary of a resistor 13. The base of the transistor 5 is connected to the collector of the transistor 4. The transistors 3 to 5 together form a switching circuit in which the transistor 3 or 5 is conducting or turned on. The base of the transistor 3 is the input and the collector of the transistor 5 is the output of the switching circuit.

The positive terminal of the battery 6 is further connected with two photosensitive resistors 14 and 15. The free terminal of the resistor 15 is connected to a resistor 17 by way of a contact 16a of the relay 16. The resistor 17 is connected with the base of the transistor 3. A second contact 16b of the relay 16 is connected with a junction between the contact 16a and resistor 17. The contact 16b can connect to either one of two capacitors 19, 20 which are placed in parallel. One electrode of each of the capacitors 19, 20 is connected with the negative terminal of the battery 6. The aforementioned control switch 21 is in parallel with that one of the capacitors 19, 20 which is connected with the relay contact 16b. The control switch 21 is closed in the non-operative or quiescent state of the timing circuit 1.

When the circuit assembly is in the state shown in FIG. 2, the photosensitive resistor 15 is connected with the relay contact 16a and capacitor 20. When the contacts 16a, 16b are caused to change their positions, the photosensitive resistor 14 forms with the capacitor 19 an RC network in the timer circuit 1. The parts 15, 20 form that portion of the timing circuit 1 which controls movements of setting rings 32, 33 when the intensity of scene light is within a higher range of intensities, and the parts 14, 19 that portion of the circuit 1 which controls the rings 32, 33 when the intensity of scene light is within a lower range of intensities.

In FIG. 2, the photosensitive resistor 14 is connected with a fixed resistor 23 by way of a third contact 16c of the relay 16. The resistor 23 is connected with the negative terminal of the battery 6. The junction between the contact 16c and resistor 23 is connected with base of a transistor 24 in the indicating circuit 2. The latter further comprises a second transistor 25, and the transistors 24, 25 together form a switching arrangement in the circuit 2. The base of the transistor 24 is the input of this switching arrangement. The transistors 24, 25 are of the n-p-n type and their emitters are joined together. The junction between these emitters is connected to a resistor 26 which is connected to the negative terminal of the battery 6. Connected between the positive terminal of the battery 6 and the collectors of transistors 24, 25 are two indicating lamps or signal lamps 27 and 28. The lamps 27, 28 indicate which one of the transistors 24, 25 is conducting or is turned on. The relay 16 which controls the aforementioned contacts 16a, 16b, 16c is connected in series with the indicating lamp 28, i.e., with that signal lamp which indicates the range of lower scene brightnesses. The collector of the transistor 24 is connected with the base of the transistor 25 by way of a resistor 29, and the base of the transistor 25 is connected with the negative terminal of the battery 6 by way of a further resistor 30. The aforementioned master switch 31 is connected between the negative terminal of the battery 6 and the remaining elements of the circuitry shown in FIG. 2.

The lamps 27, 28 can be placed into the viewfinder of the camera or behind a separate window so as to be readily observable by the user.

The operation of the shutter is as follows:

In quiescent state of the circuit assembly, when the shutter is set for operation in the range of higher scene brightnesses, the relay contacts 16a, 16b, 16c assume the first positions shown in FIG. 2. The master switch 31 is open and the control switch 21 is closed by the projection 32b of the leading setting ring 32 because the latter is held by lever 37 in cocked position.

In order to make an exposure, the user actuates the aforementioned button to turn the release lever 37 in a counterclockwise direction, as viewed in FIG. 1, whereby the lever 37 immediately closes the master switch 31. This energizes the circuit assembly shown in FIG. 2. The base of the transistor 24 acquires a potential determined by the voltage divider including the photosensitive resistor 14 and fixed resistor 23. This potential is a function of scene brightness because the resistors 14, 15 are exposed to scene light. If the intensity of scene light is satisfactory, i.e., within the higher intensity range which permits exposures with hand-held camera, the base potential of the transistor 24 is above the potential of the emitter so that the transistor 24 conducts current. The transistor 25 is cut off due to the feedback circuit including the resistor 29. The lamp 27 (which can produce green light) lights up and thus indicates to the user that the scene brightness is satisfactory, i.e., that the intensity of scene light is within a higher intensity range.

The characteristics of the photosensitive resistor 14 need not be the same as those of the resistor 15. The resistor 15 is connected into the timing circuit, i.e., the portion 15, 20 of the timing circuit then controls the movements of setting rings 32, 33 and blades 34 to determine the exposure values (aperture size and exposure time) as a function of scene brightness indicated by the signal lamp 27 of the indicating circuit 2. As the user continues to turn the lever 37 in a counterclockwise direction to make an exposure, the resistor 15 determines, with capacitor 20, the exact time when the electromagnet 7 is deenergized and hence the exposure time and the size of the aperture. The shutter closes on deenergization of the electromagnet 7 for reasons which were explained in connection with FIG. 1. Such basic operation of the timing circuit 1 is well known in the art.

If the intensity of scene light is below the aforementioned higher intensity range, i.e., below a critical minimum intensity, the potential at the base of the transistor 24 drops below a limiting value and the switching arrangement 24, 25 changes its condition, the lamp 27 is off and the lamp 28 (which can produce red light) is on because it is connected with the transistor 25. Thus, the user is informed that the shutter cannot insure a satisfactory exposure, for example, because the range of exposure values (exposure time and the size of the aperture) controlled by the photosensitive resistor 15 does not cover the prevailing scene brightness.

The relay 16 is energized when the red indicating lamp 28 is turned on. This relay causes the contacts 16a—16c to assume their second positions, i.e., the contact 16c opens, the contact 16a is connected with the resistor 14, and the contact 16b is connected with the capacitor 19. The resistor 14 and capacitor 19 then form the RC network of the timing circuit 1. The characteristics of this RC network can be selected in such a way that the timing circuit 1 then controls a pure timing program at a fixed size of the diaphragm aperture. This can be accomplished by using a capacitor 19 whose capacitance is different from that of capacitor 20, by using a resistor 14 whose resistance is different from that of resistor 15, and/or by employing compensating resistors in series and/or in parallel with the resistor 14. Thus, when the intensity of scene light is above a critical minimum value, the shutter will vary the exposure time and the aperture size as a function of changes in scene brightness. When the intensity of scene light is below such critical value, the shutter selects a fixed aperture size and merely changes the exposure time as a function of changes in scene brightness.

When the relay contact 16c opens, the base of the transistor 24 acquires a potential which corresponds to an infinitely large resistance value of the photosensitive resistor 14. The indicating circuit 2 is then in a state in which the lamp 28 is lighted to indicate to the user that the intensity of scene light is below the critical minimum value, i.e., that the camera should be mounted on a tripod or other fixed support.

The energized relay 16 attracts the lever 18 so that the arm 18a of this lever enters the path of the arm 32c on the lading setting ring 32. Thus, and if the user continues to turn the lever 37 so as to disengage the latter from the shoulder 32a, the leading ring 32 is arrested in an intermediate position in which its arm 32c bears against the arm 18a of the lever 18. This determines the aperture size, i.e., such size is the same for all exposures when the intensity of scene light is below a critical minimum value. The RC network 14, 19 causes the capacitor 19 to become charged as a function of scene brightness detected by the resistor 14. When the potential of capacitor 19 reaches a limit value, the switching circuit including the transistors 3—5 causes deenergization of the electromagnet 7 and closing of the shutter.

When the spring 39 returns the lever 37 to the idle position shown in FIG. 1, the master switch 31 opens and the relay 16 is deenergized so that the contacts 16a—16c return to the positions shown in FIG. 2. By manipulating the film transporting mechanism, the user causes the lever 43 to return the rings 32, 33 to cocked positions shown in FIG. 1.

The selection of a medium-sized aperture for exposures with long exposure time is of advantage because, when the intensity of scene light is low, the user can employ a tripod so that the exposure time can be long while the medium-sized aperture insures a satisfactory depth of field. The automatic exposure time-aperture size program can terminate at an exposure time of 1/30 second, i.e., at an exposure time which is still satisfactory for making of exposures with hand-held camera. Thus, the circuit assembly of FIG. 2 can be assembled in such a way that the relay 16 is energized when the exposure time should be longer than 1/30 second.

Without further analysis, the foregoing will so fully reveal the gist of the present invention that others can, by applying current knowledge, readily adapt it for various applications without omitting features which fairly consititute essential characteristics of the generic and specific aspects of our contribution to the art and, therefore, such adaptations should and are intended to be comprehended within the meaning and range of equivalence of the claims.

We claim:

1. In an electronically operated shutter, a combination comprising movable setting means operative to furnish optimum exposure values for a higher first and a lower second range of scene brightnesses; a timing circuit including first and second portions energizable to respectively control the movements of said setting means as a function of scene brightnesses in said first and second ranges and respectively including first and second photosensitive elements; an electronic indicating circuit for measuring the scene brightness; and automatic switchover means for energizing the appropriate portion of said timing circuit in accordance with the results of measurements of scene brightness by said indicating circuit, said switchover means comprising relay means connected in said indicating circuit and arranged to respectively connect said second photosensitive element in said indicating circuit and energize said first portion when the scene brightness is within said first range and to respectively energize said second portion and deenergize said first portion when the scene brightness is within said second range.

2. A combination as defined in claim 1, wherein each of said circuits comprises transistorized switching means and each portion of said timing circuit comprises an RC network, said photosensitive elements forming part of the respective networks.

3. A combination as defined in claim 1, wherein said shutter is a diaphragm shutter and one portion of said timing circuit is energizable to adjust said setting means so that the latter furnishes a medium-sized diaphragm aperture.

4. In an electronically operated shutter, a combination comprising movable setting means operative to furnish optimum exposure values for a first and a second range of scene brightnesses; a timing circuit including first and second portions energizable to respectively control the movements of said setting means as a function of scene brightnesses in said first and second ranges; an electronic indicating circuit for measuring the scene brightness, said indicating circuit comprising first and second lamps arranged to produce visible signals when the measured scene brightness is respectively within said first and second range; and automatic switchover means for energizing the appropriate portion of said timing circuit in accordance with the results of measurements of scene brightness by said indicating circuit, said switchover means comprising relay means connected in said indicating circuit in series with one of said lamps.

5. A combination as defined in claim 4, wherein said first range encompasses relatively high scene brightnesses and wherein said relay means is in series with said second lamp.

6. In an electronically operated shutter, a combination comprising movable setting means operative to furnish optimum exposure values for a first and a second range of scene brightnesses; a timing circuit including first and second portions energizable to respectively control the movements of said setting means as a function of scene brightnesses in said first and second ranges, each of said portions comprising a photosensitive element and a capacitor; an electronic indicating circuit for measuring the scene brightness; and automatic switchover means for energizing the scene brightness; and automatic switchover means for energizing the appropriate portion of said timing circuit in accordance with the results of measurements of scene brightness by said indicating circuit, said switchover means comprising relay means connected in said indicating circuit and comprising first, second and third contacts movable together between first and second positions, said timing circuit further comprising a switching circuit having an input connected with said first and second contacts and an output for effecting closing of said shutter, said first contact connecting one of said photosensitive elements with said input in each position thereof and said second contact connecting one of said photosensitive elements and said input with one of said capacitors in each position thereof, and a resistor connected with one of said photosensitive elements in the first position of said third contact to form therewith a voltage divider, said indicating circuit comprising a switching arrangement having an input connected with a junction between said resistor and said photosensitive element of said voltage divider in the first position of said third contact, and a source of electrical energy having a negative terminal connected with said resistor and a positive terminal connected with said photosensitive elements.

7. In an electronically operated diaphragm shutter, a combination comprising setting means operative to furnish optimum exposure values for a first and a second range of scene brightnesses; a timing circuit including first and second portions energizable to respectively control the movements of said setting means as a function of scene brightnesses in said first and second ranges, one portion of said timing circuit being energizable to adjust said setting means so that the latter furnishes a medium-sized diaphragm aperture; an electronic indicating circuit for measuring the scene brightness; and automatic switchover means for energizing the appropriate portion of said timing circuit in accordance with the results of measurements of scene brightness by said indicating circuit, said switchover means comprising relay means connected in said indicating circuit and including an armature which extends into the path of movement of a portion of said setting means in response to energization of said one portion of said timing circuit.

8. A combination as defined in claim 7, wherein said portion of said setting means comprises a setting member movable between two end positions and through an intermediate position corresponding to said medium-sized aperture and said armature is a lever which extends into the path of movement of said setting member in response to energization of said one portion of said timing circuit to arrest said setting member in said intermediate position.

9. A combination as defined in claim 8, further comprising means for biasing said lever away from the path of movement of said setting member.

10. A combination as defined in claim 8, wherein said setting means further comprises a second setting member movable with and relative to said first mentioned setting member and blade means coupled with said setting members to change the aperture size when one of said setting members moves with reference to the other setting member.